United States Patent [19]

Verdier

[11] 4,442,453
[45] Apr. 10, 1984

[54] PHOTO-RECONNAISSANCE SYSTEM

[75] Inventor: James E. Verdier, Dayton, Ohio

[73] Assignee: The United States of America as represented by the Secretary of the Air Force, Washington, D.C.

[21] Appl. No.: 347,383

[22] Filed: Feb. 9, 1982

[51] Int. Cl.³ .............................................. H04N 7/18
[52] U.S. Cl. .................................... 358/109; 358/87; 358/102; 358/210
[58] Field of Search ................. 358/97, 103, 108, 109, 358/210, 87, 102, 146, 214; 352/131; 354/65, 66, 67, 68, 83

[56] References Cited

U.S. PATENT DOCUMENTS

| | | | |
|---|---|---|---|
| 2,622,495 | 12/1952 | Jensen | 354/65 |
| 2,637,022 | 4/1953 | De France | 358/109 |
| 3,066,589 | 12/1962 | Beatty | 95/12.5 |
| 3,256,387 | 6/1966 | Beste | 358/87 |
| 3,492,419 | 1/1970 | Bartonik | 358/87 |
| 3,854,004 | 12/1974 | Baomel et al. | 358/102 |
| 4,122,521 | 10/1978 | Rick et al. | 364/424 |
| 4,143,971 | 3/1979 | Levy et al. | 356/404 |

FOREIGN PATENT DOCUMENTS 453596 9/1936 United Kingdom ................ 358/109

OTHER PUBLICATIONS

Kosofsky-Lunar Orbiter: A Photographic Satellite-Jour. of SMPTE, Sep. 1965, vol. 74, #773–778.

Primary Examiner—Joseph A. Orsino, Jr.
Attorney, Agent, or Firm—Donald J. Singer; Bernard E. Franz

[57] ABSTRACT

A photo-reconnaissance system in which the landscape is photographed on film. The film is then developed and scanned by electro-optical sensors. The output signal from the E-O sensors is transmitted to a ground station where it is demultiplexed and displayed on a plurality of television type monitors. An operator can view the reconnaissance scene in near-real time and transmit commands back to the airborne station directing a change in flight course or a magnification of a particular target. A permanent record of the reconnaissance scene can be obtained either from the on-board film or by making a print from the television type monitors.

9 Claims, 3 Drawing Figures

PHOTO-RECONNAISSANCE SYSTEM

RIGHTS OF THE GOVERNMENT

The invention described herein may be manufactured and used by or for the Government of the United States for all governmental purposes without the payment of any royalty.

BACKGROUND OF THE INVENTION

The field of the present invention is in the aerial photographic art and, more particularly, that of aerial photographic art used in reconnaissance work in conjunction with a ground station.

In conventional photo-reconnaissance systems where camera photos of the ground are taken from an aircraft flying along an area of interest, the photo interpreter on the ground after the flight requires many hours to develop, process and interpret the film. Information of intelligence value contained on the film is made available for use only after the flight has been completed and the film transported to the photo lab for processing. Inherent in these systems is the time delay involved, and the possibility of accidents and loss of information obtained before it has been converted into useable form. When a great number of photos are taken, the large amount of time consumed is obviously unsatisfactory. Often, reconnaissance and intelligence agencies need to be able to detect hostile troop movements and identify enemy vehicles within minutes after observation, or, preferably, in real time. In addition, there is a requirement for pictorial hard copy data that can be viewed, copied and filed.

Previous developments in the photo-reconnaissance art include U.S. Pat. No. 3,066,589 which discloses on-board film processing, scanning, and transmission to a ground station. Also, U.S. Pat. No. 4,143,971 teaches a photo-reconnaissance system in which photocells and a color filter technique are employed to identify the signature of the target of interest. Neither patent discloses a real time analysis of the photographs that would permit an operator to quickly identify a target of interest.

SUMMARY OF THE INVENTION

It is therefore an object of the invention to provide a new photographic reconnaissance system for viewing the reconnaissance scene in near-real time from a remote ground station and additionally providing the capability of obtaining a permanent photographic record.

Another object of the invention is to provide a new photographic reconnaissance system capable of responding to commands from a remote ground station.

According to the invention, exposed film from a camera is developed on-board the aircraft and scanned by an electro-optical reader. The information on the film is thereby converted into a video signal, multiplexed, and transmitted to a ground station via an RF transmitter/receiver data link. The ground station demultiplexes the signal and feeds it to one or more displays for real time viewing by the operators. The operator's controls have the capability of transmitting various commands to the airborne station.

A feature of the invention relates to the provision that allows the airborne portion to be housed as a detachable unit, such as a pod, in which all of the equipment is carried and which can be attached to and detached from an aircraft or helicopter. Alternately, the airborne portion can be packaged in such a manner that it can be carried on-board a remotely piloted vehicle or a drone.

Another feature of the invention relates to the provision that allows the ground station operator to enlarge a portion of the picture and display it in real time on his monitor.

Another feature of the invention relates to the provision that allows the ground station operator to transmit commands to the reconnaissance camera or the vehicle's flight controls.

Another feature of the invention relates to the provision that allows the ground station operator to place his current picture in storage and/or direct that a permanent copy of the picture be printed.

These and other advantages, features, and objects of the invention will become more apparent from the following description taken in connection with the illustrative embodiment in the accompanying drawings.

DETAILED DESCRIPTION OF THE INVENTION

Figure 1:
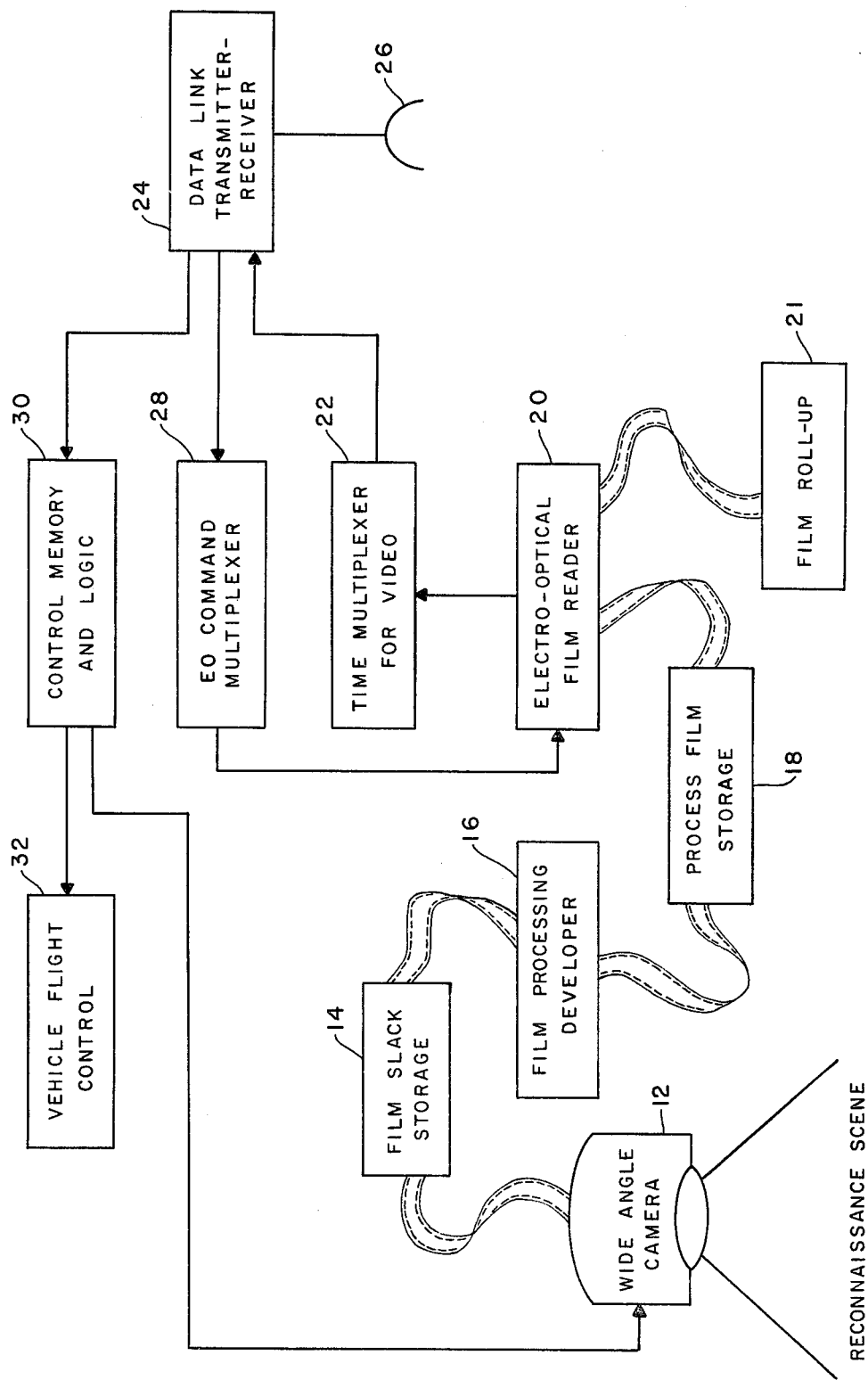
FIG. 1 is a functional block diagram of an embodiment of the invention representing the airborne station.
Figure 2:
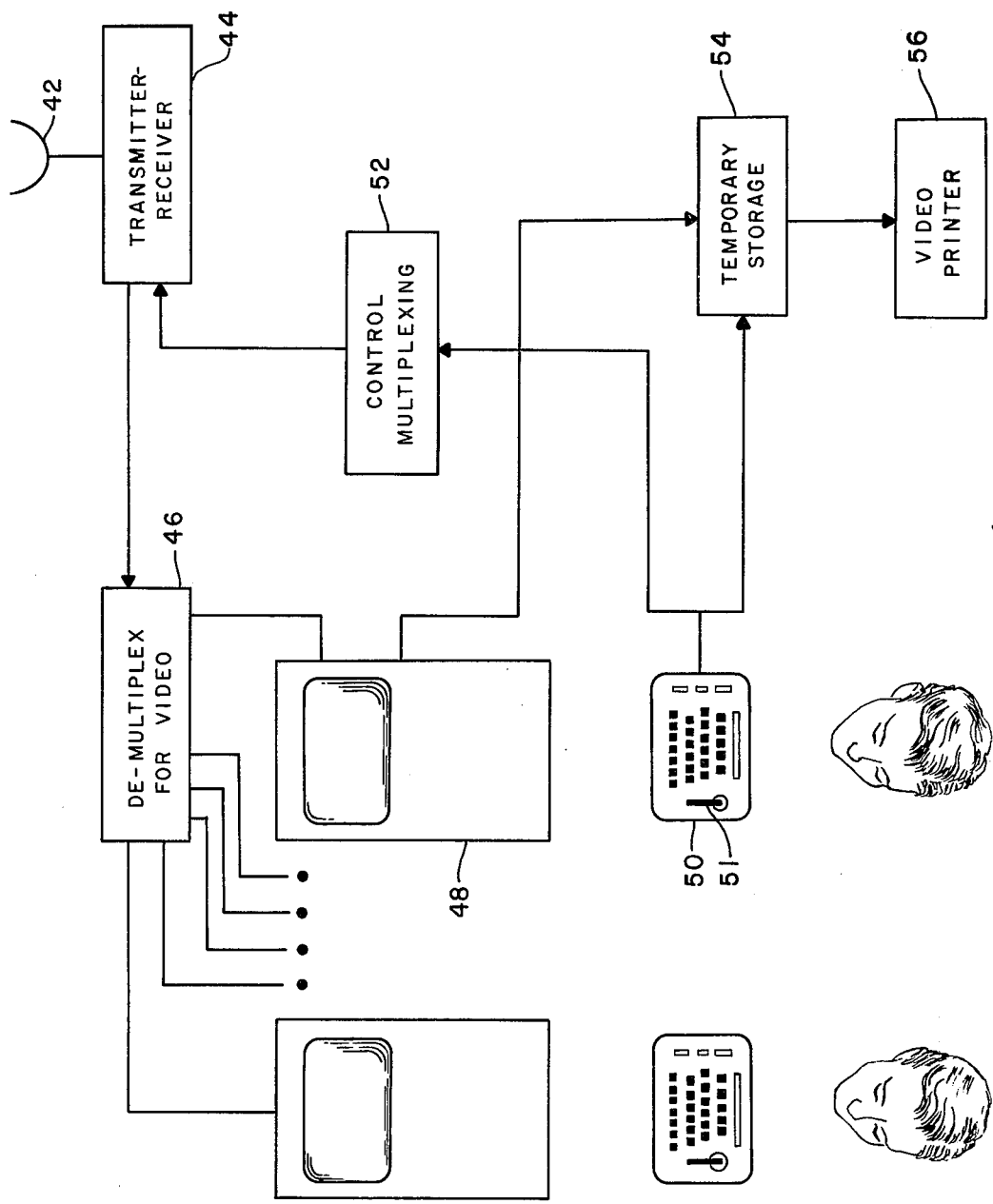
FIG. 2 is a functional block diagram of an embodiment of the invention representing the ground station.

The photo-reconnaissance system comprises an airborne station shown in FIG. 1 and a ground station shown in FIG. 2. In a preferred embodiment, the ground station has a plurality of operator positions (for example five positions), each of which has a video viewer.

The block diagram of FIG. 1 illustrates the operation of the invention's airborne station. A supply of film is contained within a wide angle camera 12 and is exposed in-flight to photograph an area of interest. This wide angle camera, when actuated, records an image of the area of interest on film. The wide angle camera produces a long, narrow picture with the narrow direction of the picture being in the direction of flight. Exposed film is transferred from the camera to a film slack storage box 14 where the discreet frame-by-frame travel is transformed to a continuous flow. From the film slack storage box 14, the film is routed to a suitable film developer and processor 16 where it is developed into a standard negative film. Following processing, the film travels to a processed film storage device 18 where it is stored until an electro-optical film reader 20, located immediately downstream, is ready to accept and examine the processed film. As this storage device is capable of storing all or a large portion of the available film, the rate at which the electro-optical device reads the film is independent of the rate at which the film travels.

Figure 3:
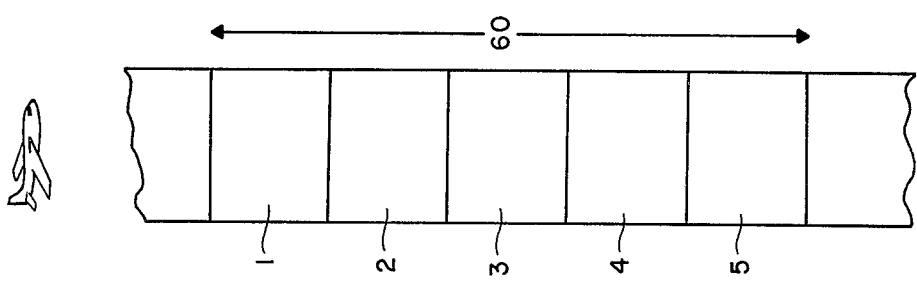
FIG. 3 is a diagram of a length of film containing one field of view divided into five photo frames.

FIG. 3 shows a section of film 60 for one field of view, which is exposed at one time. By way of example, it is shown divided into five sections numbered 1 to 5. As shown, section 3 photographs a view directly below the aircraft, sections 1 and 2 view toward the left or port side and sections 4 and 5 view toward the right or starboard side. The complete length of film has several fields of view which are numbered in sequence, and each field of view is subnumbered for the five sections or photo frames, as identified by the time multiplexer 22. In one embodiment, one photo frame at a time is positioned in the reader 20, and normally provides one frame of video. In the enlargement mode, a selected portion of the photo frame in the reader 20 provides a full video frame.

As each photo frame is positioned in the reader, it is scanned once for a video frame, which is identified as one of the photo frames 1 to 5 and transmitted to the corresponding one of the operator positions at the ground station. This single video frame is stored and repeated on the television screen at the normal 30 times per second, so that a still picture is displayed. Normally the picture will remain until the corresponding photo frame of the next field of view reaches the reader 20. The operator has the option of changing to the enlargement mode while viewing one frame, so that for the next field of view, the video frame displays the selected portion of the photo frame.

The electro-optical film reader 20 (see FIG. 1) is a conventional device used for converting the pictorial information on the film into a standard video output signal. The film passes between a bank of light sources and a corresponding array of photoreceptors. The photoreceptors, which could be, for instance, charge coupled devices (CCDs), examine the entire length of the film, transitioning the information thereon into a television type analog signal. Preferably, this reader has the photoreceptors mounted on a movable track capable of traveling both along and across the film as well as moving closer or further away from the film, thereby adjusting the field of view. Servomotors or stepping motors cause the movable photoreceptors to travel to that portion of the film that contains the area of interest and view only a small portion of the film, thereby creating a magnifying or enlarging effect. This feature is extremely valuable for close scrutiny of a particular target within the overall field of view.

The video signal from the electro-optical film reader is sent to a time multiplexer 22 which codes each video frame by designating the beginning and end of an individual video frame within the field-of-view. These time multiplexed video signals are fed into a data link transmitter/receiver 24 for transmission via an antenna 26 to a ground station (see FIG. 2). In addition to receiving the signal, the ground station, as will be discussed in greater detail below, transmits similar command signals to the airborne station which are received at antenna 26 and corresponding data link 24. Commands affecting the video signal and corresponding pictorial presentation are routed to an electro-optical command multiplexer 28 before being passed to the electro-optical film reader. In addition, commands requesting the magnification of a portion of a video frame are transitioned to the film reader via the command multiplexer which identifies the frame of interest. Commands affecting the camera or flight controls are routed to a control memory and logic circuit 30 for buffering before sending the appropriate signal to the camera 12 or the vechicle's flight controls 32.

The block diagram of FIG. 2 illustrates the operation of the invention's ground station. The received RF signal is captured by an antenna 42 and passed to a transmitter/receiver 44 which processes the signal and outputs a video signal. The video signal is fed into a demultiplexer 46 which determines the boundaries of each video frame as it appears within the video signal. The demultiplexer then sends an output signal for each video frame to a cathode ray tube 48 of the type found in a standard television receiver. In this manner, each portion of the photograph of the reconnaissance scene is recreated on a television screen for analysis in real time. This video screen displays the picture until the next scene is available or until the operator intervenes to store the video display within the associated electronic circuitry. Operationally, multiple television screens are used for a more detailed examination of the reconnaissance scene. In such a situation, each photograph of the reconnaissance scene is divided into any number of scenes (video frames) so that each operator views a portion of the complete photograph. In conjunction with each television screen is an operator's console 50 which contains a signal generator and coding circuitry along with a control panel with a plurality of keyboard type buttons. The operator responds to the information displayed on the screen by engaging the buttons to select his commands. These engaged buttons apply a code to the output of the signal generator corresponding to the desired instruction and transitions this coded signal to the airborne station and/or television screen. The console may also contain a joystick 51 which is used to position a bullseye type target indicator anywhere on the television screen to identify the specific area of the screen the operator wishes to enlarge. Alternately, instead of a joystick a plurality of keyboard buttons can be used, each of which correspond to a specific and individual zone on the television screen. These buttons each engage the magnification feature for their particular zone. If, for example, the target of interest appears in zone 7 on the screen, by pressing the button corresponding to zone 7, the film reader 20 may be commanded to read this zone so that only that portion of the picture would appear on the screen. If an operator wishes to engage the magnification mode, his command is entered at the console and the signal passed to a control multiplexing circuit 52. Here the signal is properly coded to correlate the operator's video display with the corresponding picture within the airborne station and likewise coded to identify the area of interest that the operator wishes to enlarge. The appropriate scene in the airborne station is then multiplexed back to the ground station. All operator commands affecting the vehicle flight controls or the reconnaissance camera are similarly transmitted through the control multiplexing circuit and then passed to the data link transmitter/receiver 44 for transmission to the airborne station. The operator also has the option of transferring scenes of high interest into a temporary storage medium 54 for later recall and the option of transferring the scene from the storage medium to a video printer 56 to obtain a permanent record of the information on the screen. In addition to these commands, the operator can regulate the speed at which the film passed through the reader, and can command the film to reverse in order to obtain a second look at a particular target. Also, the operator can command the flight vehicle to repeat the flight scenario with or without change in altitude and direction.

The camera, film selection, and the flight altitude determine the minimum discernible resolution limit at the film. Resolution in the electro-optical reader is limited by the television type format is much less than that of the film during normal operation. In the magnified mode, the resolution of the scene may approach that of the basic film. Film is recovered for permanent record, in-depth viewing and contrast enhancement where the information may be of further value. The time between pictures is chosen to be compatible with the ground observer's response time, flight speed and altitude, and picture overlap.

Thus, while preferred constructional features of the invention are embodied in the structure illustrated herein, it is to be understood that changes and variations may be made by the skilled in the art without departing from the spirit and scope of the invention.

I claim:

1. An apparatus for providing to a ground station video signals representative of aerial reconnaissance from an airborne station, said apparatus comprising:

a camera having a wide angle lens; a supply of photographic film in said camera; said camera housed in said airborne station and adapted to photograph onto said film aerial reconnaissance scenes, with a field of view consisting of an amount of film exposed during one exposure time period, the field of view having a long axis transverse to the direction of flight;

film processing means on said airborne station for continuously developing said aerial reconnaissance scenes;

electro-optical reading means on said airborne station for converting information in said aerial reconnaissance scenes to a video signal in successive frames, with means for dividing said field of view into a plurality of photo frames 1 through N, with means for converting at least a portion of each photo frame into a video frame, the electro-optical reading means being controllable to select a particular location of a frame of said film of a particular size for full video frames to be displayed on a full video screen thereby resulting in an enlargement effect;

transmitting means on said airborne station coupled to said electro-optical reading means for transmitting said video signal to said ground station;

receiving means on said ground station for receiving said video signals;

display means on said ground station comprising a plurality of operator's positions 1 through N corresponding respectively to photo frames 1 through N of each field of view for displaying in real time said video signals of the corresponding frame 1 through N; each operator position having a video screen, display storage means for storing video signals and a plurality of manually controlled input devices;

control means on said ground station for an operator to input commands to the airborne station, including commands to select a particular location of the photo frame for a full video frame;

means for transitioning each video frame of the field of view to its corresponding operator's position and placing said video frame in said display storage means;

means for transitioning each video frame from said display storage means to said operator's display means repetitively whereby each display remains motionless for a short period of time;

second transmitter means on said ground station for transmitting operator's commands to said airborne station; and second receiver means on said airborne station for receiving signals from said ground station for controlling said airborne station.

2. The apparatus of claim 1 wherein said airborne station further includes a control and memory logic means coupled from said second receiver means to said camera and also to a flight control system of a craft carrying the airborne station.

3. The apparatus of claim 2 wherein said ground station further includes a temporary storage means coupled to said display means and said control means for providing display means storage on a temporary basis.

4. The apparatus of claim 3 wherein said ground station further includes a video printing means coupled to said temporary storage means for making a permanent record of information contained in the temporary storage means.

5. The apparatus of claim 4 further including film storage means before and after said film developing means for storing film and adjusting the rate of film flow.

6. A method of performing aerial reconnaissance missions from an airborne station, said method comprising the steps of:

photographing a scene on film with a camera having a wide angle lens, with a field of view having a long axis transverse to the direction of flight;

developing said film;

reading said developed film using an electro-optical reader and converting information found on the film to a video signal which includes dividing said field of view into N photo frames and converting at least a portion of each photo frame into a video frame; the electro-optical reading means being controllable to select a particular location of a frame of said film of a particular size for full video frames to be displayed on a full video screen thereby resulting in an enlargement effect;

transmitting said video signal to a receiver at an associated ground station;

displaying said video signal at said ground station, on N video screens, with each video screen corresponding to a frame of the field of view so that the display on each screen remains motionless for a short period of time;

inputting commands from an operator at each screen at the ground station, which may include commands to select a particular portion of the corresponding frame to be displayed on a full video screen; and transmitting said commands to a receiver on said airborne station.

7. The method according to claim 6, wherein said method further includes interfacing an operator's commands received at the airborne station with the camera and also with a flight control system of a craft carrying the airborne station.

8. The method according to claim 7, wherein said method further includes storing said video display on a temporary basis in response to an operator's command.

9. The method according to claim 8, wherein said method further includes printing a permanent copy of said video display from said stored video display.

* * * * *